United States Patent
Dravneek et al.

(10) Patent No.: US 12,260,694 B2
(45) Date of Patent: Mar. 25, 2025

(54) TOKEN THREAD AUTHENTICATION SYSTEM FOR PHYSICAL SPACE ACCESS

(71) Applicant: BANK OF AMERICA CORPORATION, Charlotte, NC (US)

(72) Inventors: Victoria L. Dravneek, Charlotte, NC (US); Manu Jacob Kurian, Dallas, TX (US); Ana Maxim, Arlington, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 331 days.

(21) Appl. No.: 17/868,229

(22) Filed: Jul. 19, 2022

(65) Prior Publication Data

US 2024/0031153 A1     Jan. 25, 2024

(51) Int. Cl.
*G07C 9/27* (2020.01)
*G06Q 20/38* (2012.01)
*H04L 9/00* (2022.01)

(52) U.S. Cl.
CPC ........... *G07C 9/27* (2020.01); *G06Q 20/3821* (2013.01); *H04L 9/50* (2022.05)

(58) Field of Classification Search
CPC ........ G07C 9/27; G06Q 20/3821; H04L 9/50; H04L 9/3297
See application file for complete search history.

(56) References Cited

U.S. PATENT DOCUMENTS

| | | | |
|---|---|---|---|
| 8,245,283 B2 | 8/2012 | Dawson et al. | |
| 9,635,000 B1 | 4/2017 | Muftic | |
| 10,691,830 B2 | 6/2020 | Munro et al. | |
| 11,139,958 B2 | 10/2021 | Smith et al. | |
| 11,296,887 B2 | 4/2022 | Bruso et al. | |
| 11,539,526 B2 | 12/2022 | Channa et al. | |
| 2017/0111175 A1 | 4/2017 | Oberhauser et al. | |
| 2017/0124535 A1 | 5/2017 | Juels et al. | |
| 2018/0109516 A1 | 4/2018 | Song et al. | |
| 2019/0311147 A1 | 10/2019 | Gollogly | |
| 2019/0342096 A1 | 11/2019 | Starosielsky et al. | |
| 2020/0184041 A1 | 6/2020 | Andon et al. | |
| 2021/0182422 A1 | 6/2021 | Basu | |
| 2021/0281410 A1 | 9/2021 | Hain | |
| 2021/0312081 A1 | 10/2021 | Leekley et al. | |
| 2022/0222364 A1* | 7/2022 | Roberts | G06F 21/64 |
| 2023/0360032 A1* | 11/2023 | Lee | G06Q 20/3674 |
| 2023/0360034 A1* | 11/2023 | DeLuca | G06Q 20/065 |

\* cited by examiner

*Primary Examiner* — Brian Wilson
(74) *Attorney, Agent, or Firm* — Moore & Van Allen PLLC; Nicholas C. Russell

(57) ABSTRACT

Systems, computer program products, and methods are described herein for token thread authentication system for physical space access. The present invention is configured to extract and organize collected NFTs and tokens within a first plurality of threads in accordance with a set of chronological and authenticating parameters. The present invention is structured to interact with an entity network system to receive authenticating requirements, query stored tokens, and present a token thread for achieving authentication. The system is structured to verify the token thread authentication and to grant access to a location to a requesting user. The system is configured to generate and to present a display associated with the token thread authentication process.

20 Claims, 8 Drawing Sheets

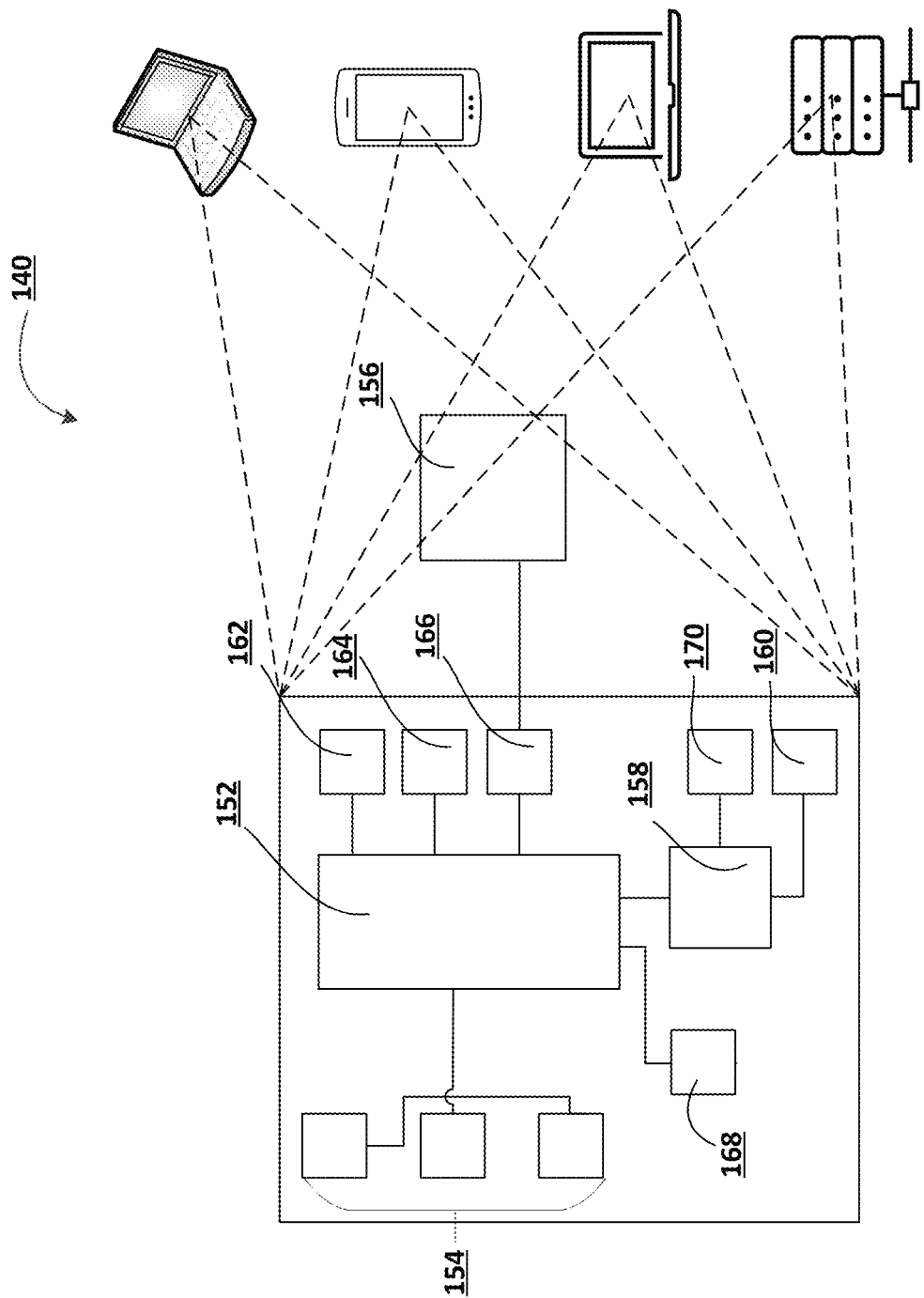

TOKEN THREAD AUTHENTICATION SYSTEM FOR PHYSICAL SPACE ACCESS

BACKGROUND

Physical space access control is a vital process for individuals and businesses. Due to the large number of physical spaces, effective, efficient access control is critical. Furthermore, authentication parameters may differ for governing access to physical spaces, creating complexities and exacerbating the issue with authenticating and determining whether to grant access. The problems compound when persons or entities maintain identities in virtual worlds, such as simulated digital environments. The problem arises due to the relative anonymity of an entity in a virtual world and difficulties matching that entity with authenticating information about that entity in the physical world. Therefore, a need exists for a token thread authentication system for physical space access to bridge the gap between virtual and physical worlds.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented. In some embodiments, or in combination with any of the previous embodiments, the at least one processing device is further configured to: extract authenticating information in at least one non-simulated digital environment, wherein the authenticating information originated from a plurality of networks associated with the entity; store the extracted authenticating information into a second plurality of threads; organize the extracted authenticating information within the second plurality of threads, according to a second set of chronological and authenticating parameters; and construct and transmit the query for the entity network system to query the second plurality of threads, wherein the query is structured to retrieve the token thread authentication within the first plurality of threads and to retrieve authenticating information from the first plurality of threads and the second plurality of threads to satisfy the authentication request.

Embodiments of the present invention comprise systems, methods, and computer program products that address these and/or other needs by providing an innovative system, method, and computer program products for token thread authentication for physical spaces access. The invention is structured for the extraction, collection, and organization of non-fungible tokens (NFTs) from a simulated digital environment for gaining access to a location, comprising extracting NFTs collected by a user from at least one simulated digital environment, wherein the NFTs collected are stored as a user NFT collection; organizing the user NFT collection within a first plurality of threads, according to a set of chronological and authenticating parameters; receiving, from a first network device, a technology resource request associated with an access authentication verification associated with a front-end resource associated with an entity for the user to grant access to a location; determining an access authentication requirement using the technology resource request, wherein the access authentication requirement comprises required tokens for a token thread authentication stored within the first plurality of threads to satisfy the authentication request; construct and transmit a query for an entity network system to query the first plurality of threads for the token thread authentication within the first plurality of threads to satisfy the authentication request; receiving the query results from the entity network system, wherein the results comprise all NFTs associated with the token thread authentication for authenticating the access request; presenting the token thread authentication within the first plurality of threads received from the query across the entity network system to the front-end resource associated with the entity; verifying the token thread authentication returned from the query satisfied the authentication requirement and determine to grant access to the location; and generating a real-time interactive technology resource interface associated with the front-end resource, wherein the real-time technology resource interface is structured to manipulate and to present graphical interface objects associated with the token thread authentication, and initiating presentation of the real-time interactive technology resource interface via a display device of a user device associated with the user.

In some embodiments, or in combination with any of the previous embodiments, the token thread authentication further comprises multiple threads for authentication associated with different levels of security access, wherein the different levels of security access are associated with the set of chronological and authenticating parameters to verify financial statistics, credit history, account ownership, and account access permissions associated with the user.

In some embodiments, or in combination with any of the previous embodiments, the at least one processing device is further configured to: identify and authenticate a member of a member group from the simulated digital environment in the location without sharing the authenticating information to other members of the member group. In some embodiments, or in combination with any of the previous embodiments, the at least one processing device is further configured to: use the token thread authentication in a simulated digital environment to access the location, wherein the location is a simulated digital environment. In some embodiments, or in combination with any of the previous embodiments, the at least one processing device is further configured to: use the token thread authentication in a non-simulated digital environment to access the location, wherein the location is a physical location.

In some embodiments, the invention further comprises constructing a first log for the extraction of tokens from the simulated digital world, wherein the first log contains a first timestamp of the extraction for each token, a reference address of each token on a distributed or decentralized network, and a thread reference location of each token within the first plurality of threads;

In some embodiments, the invention further comprises constructing a second log containing the authenticating information within the first plurality of threads and the second plurality of threads, including a second timestamp of the collection of the authenticating information, a type of the authenticating information, and a reference location of the authenticating information within the second plurality of threads.

In some embodiments, the invention further comprises constructing a third log of access requests, wherein the third log includes a third timestamp for each access request, a location identity of the location, an entity network system identity, an authenticating information requirement from the first plurality of threads and the second plurality of threads, the query to the entity network system, a fourth timestamp of the query, the results of the query to the entity network system, a fifth timestamp of the results of the query, and a result of whether the access request granted permission to the location.

In some embodiments, the invention further comprises generating a second real-time interactive technology resource interface associated with the front-end resource, wherein the second technology resource interface is structured to manipulate and to present graphical interface objects associated with the first log, the second log, and the third log.

In some embodiments, the invention further comprises initiating presentation, via a second display device of the user device associated with the user, of the second real-time interactive technology resource interface. The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
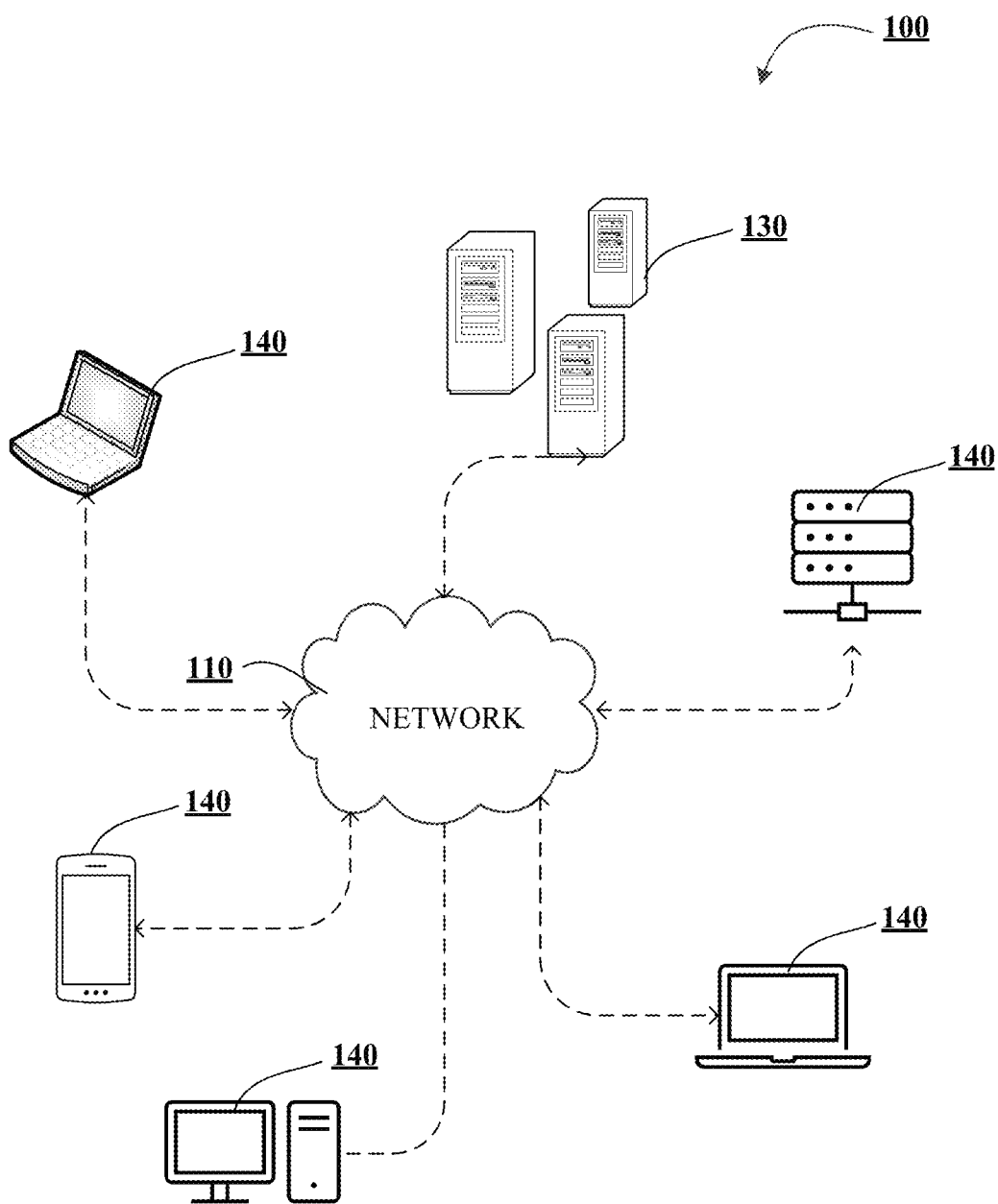
Figure 1B:
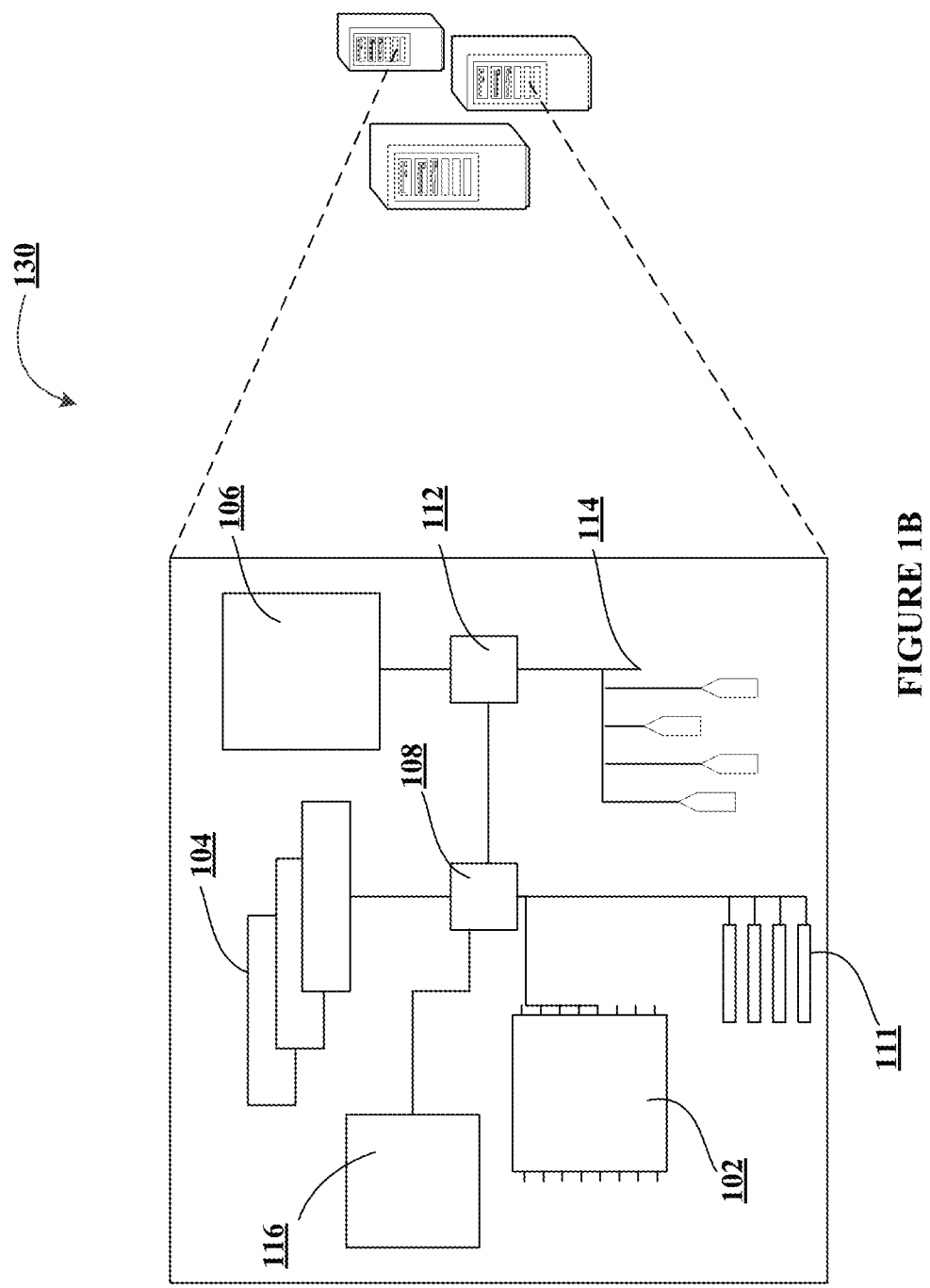
Figure 2A:
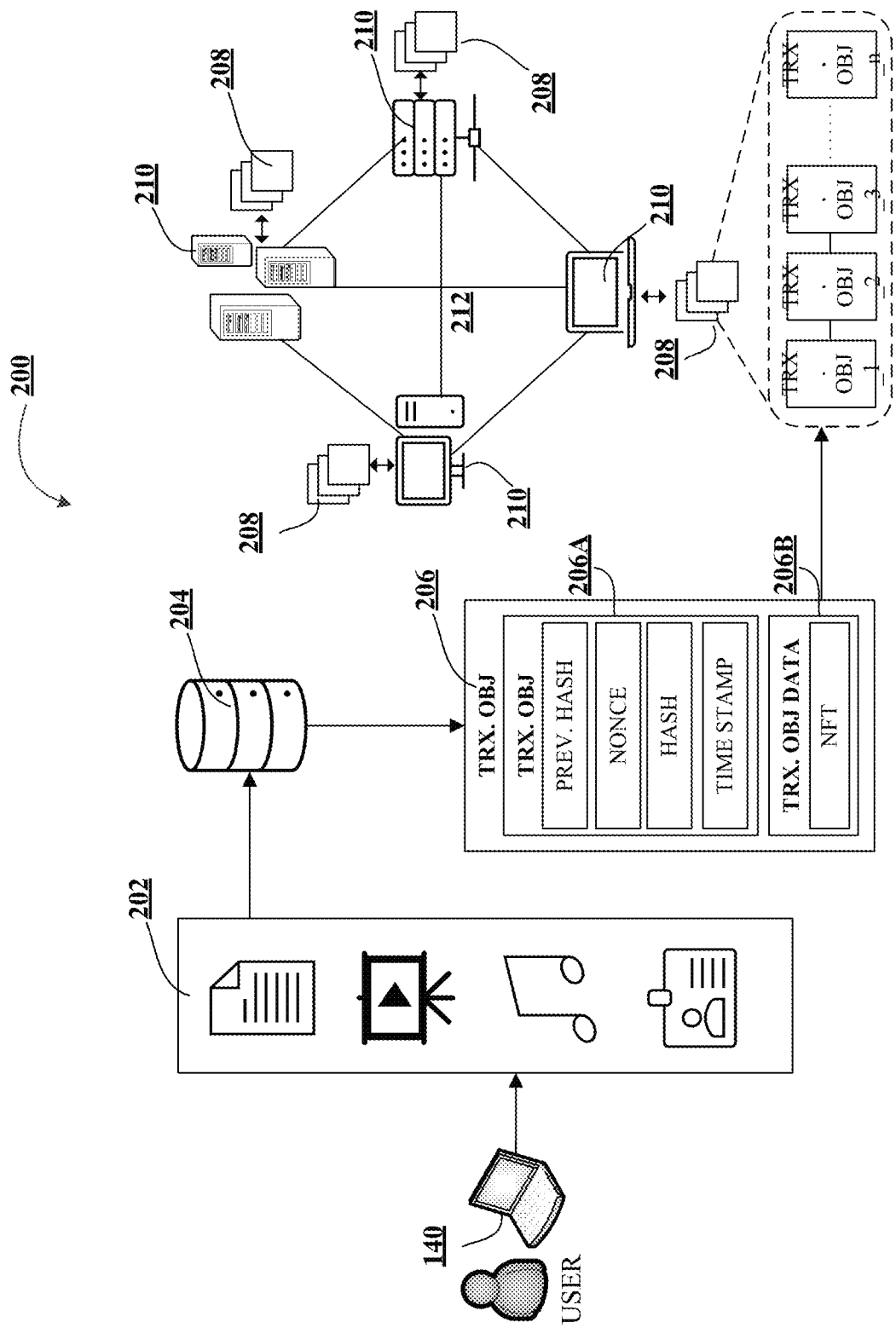
Figure 2B:
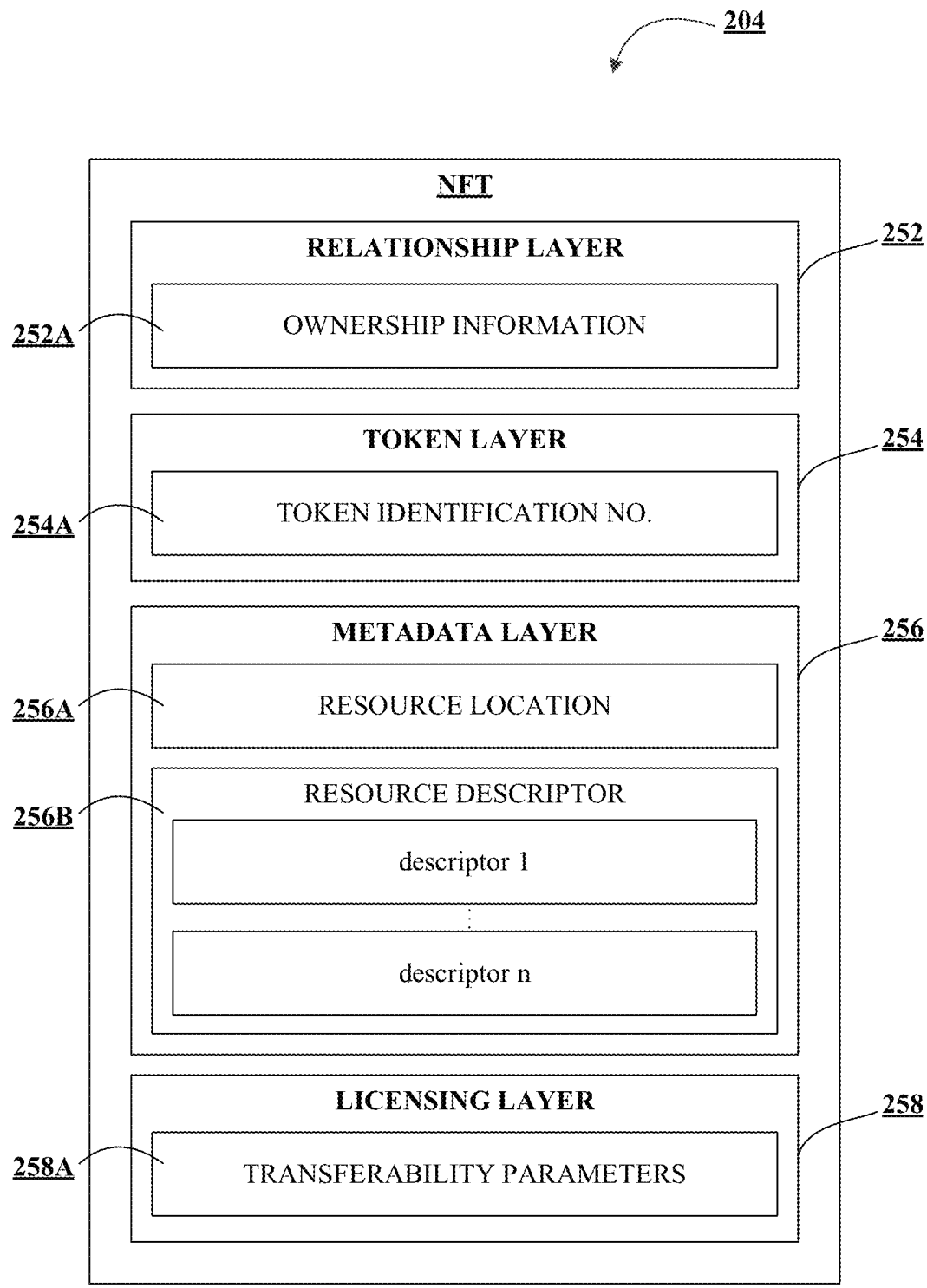
Figure 3:
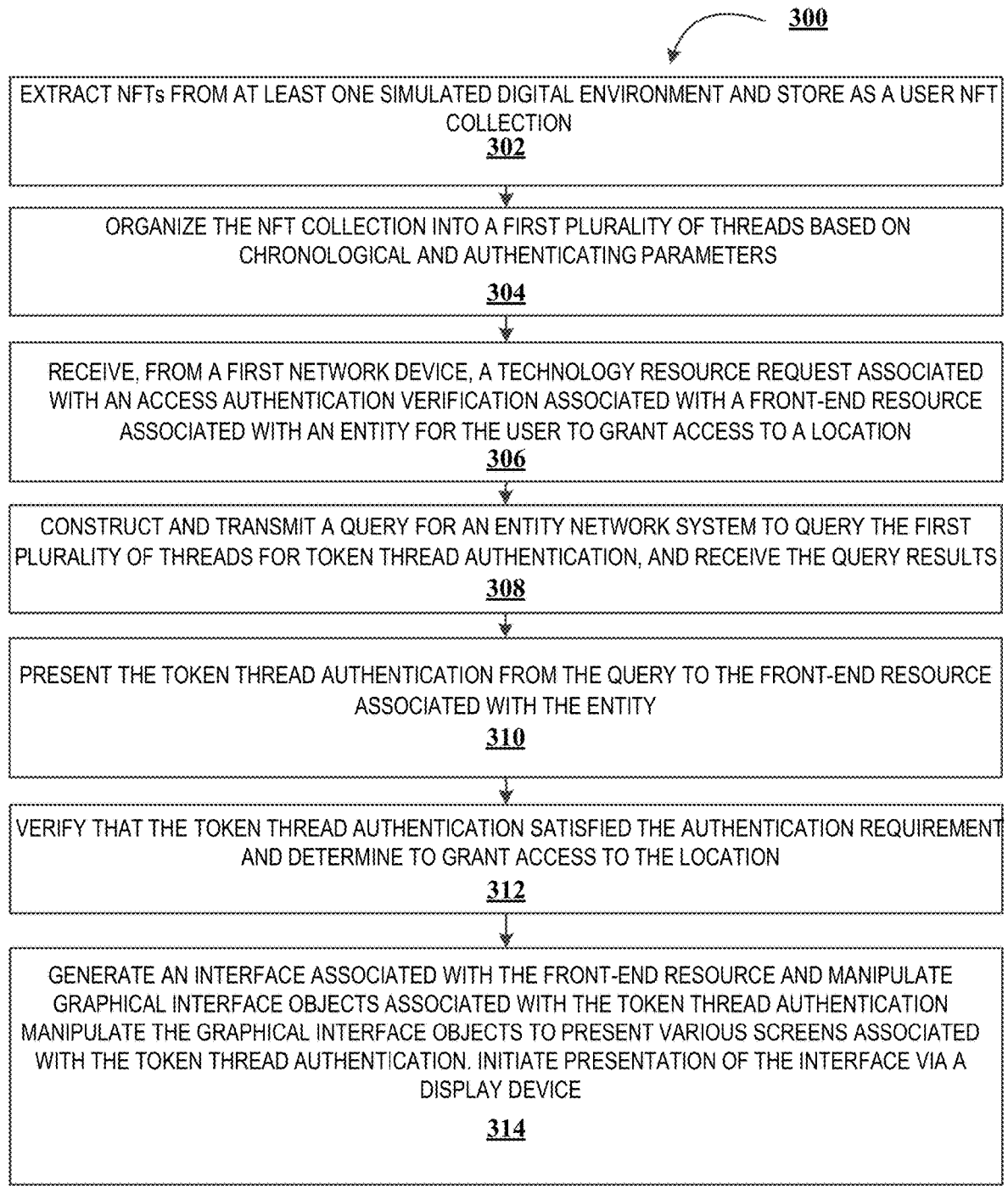
Figure 4:
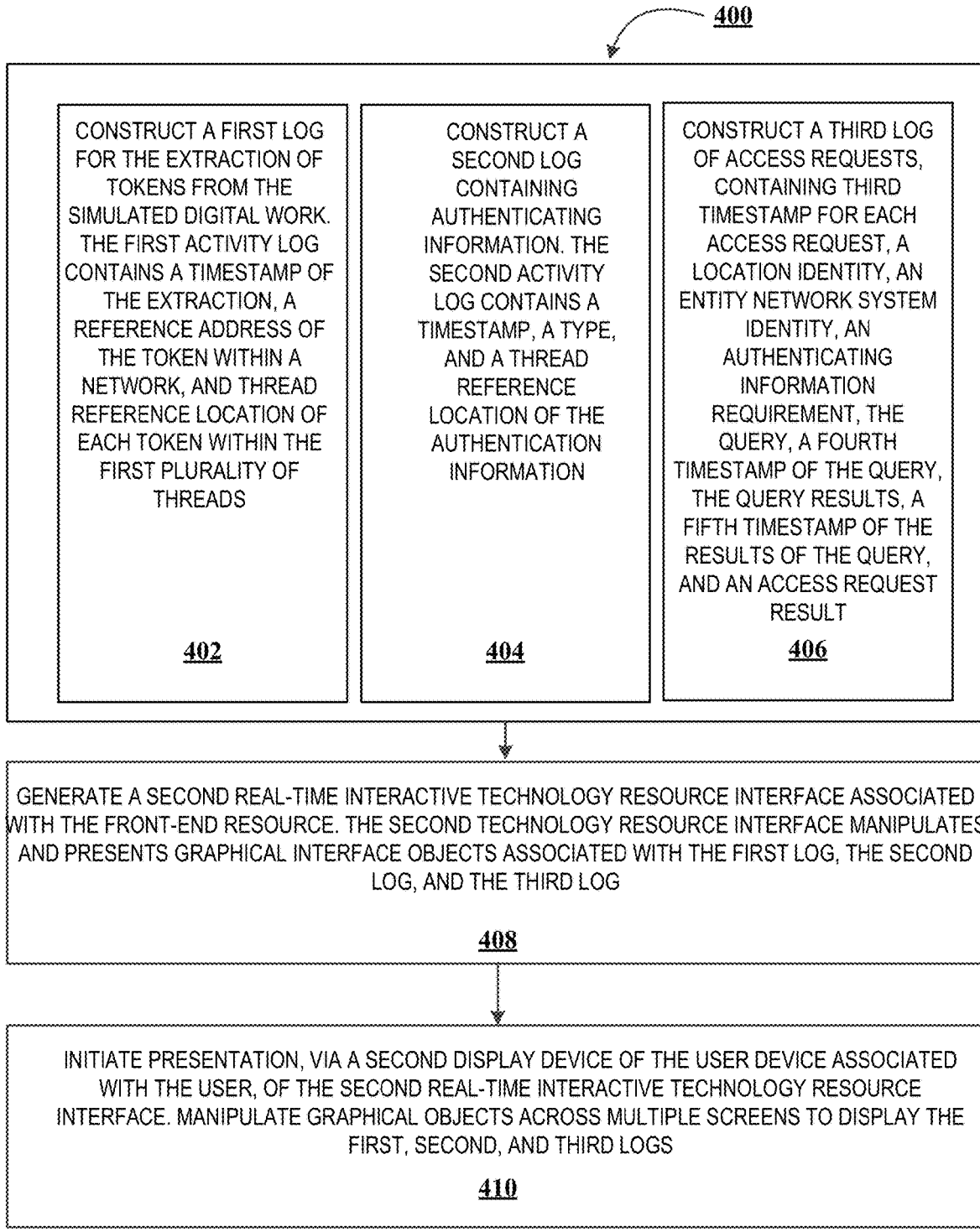
Figure 5:
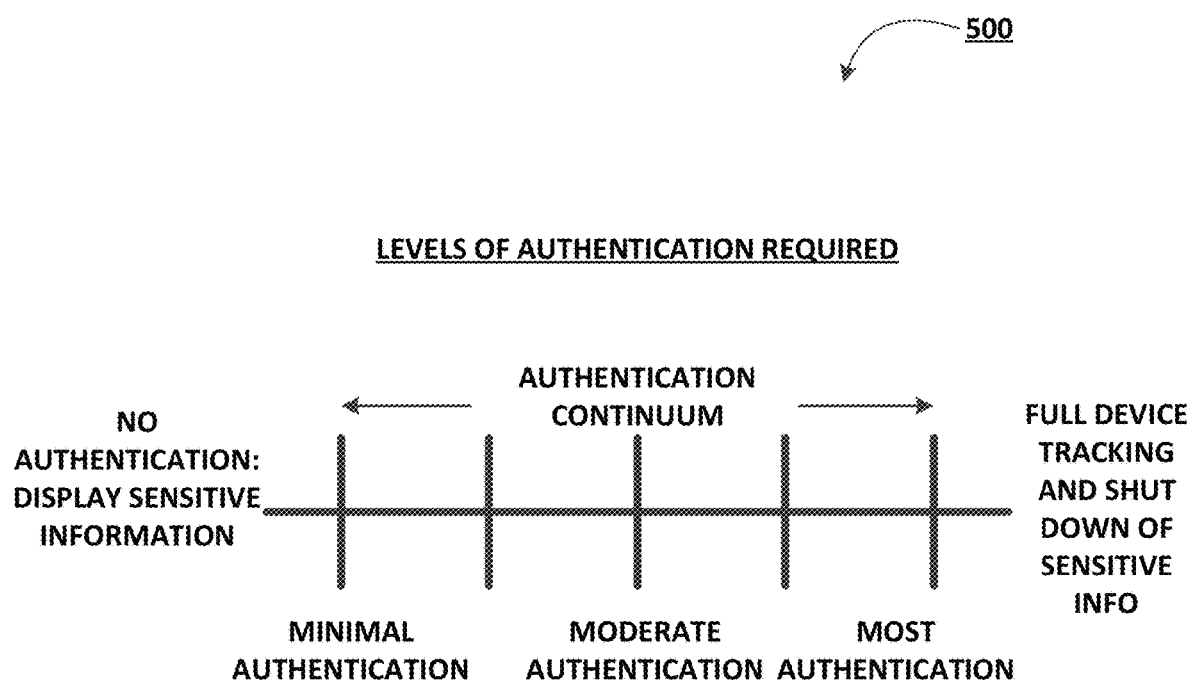

Having thus described embodiments of the invention in general terms, reference will now be made the accompanying drawings, wherein:

FIGS. 1A-1C illustrates technical components of an exemplary distributed computing environment for a Token Thread Authentication System for Physical Space Access, in accordance with an embodiment of the invention;

FIG. 2A-2B illustrates technical components of an exemplary non-fungible token (NFT) creation process and multi-layered documentation of resources within NFTs;

FIG. 3 illustrates a process flow for a token thread authentication System for physical space access, in accordance with an embodiment of the invention;

FIG. 4 illustrates a process flow for the creation and presentations of logs associated with a token thread authentication system for physical space access; and FIG. 5 illustrates a continuum for levels of authentication requirements based on authentication parameters.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority, or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships, affiliations, or accounts with the entity. In some embodiments, the user may be an employee of the financial institution or an entity capable of operating the system described herein. In some embodiments, a user may be any individual or entity who has a relationship with a customer of the entity or financial institution. For purposes of this invention, the term "user" and "customer" may be used interchangeably.

As used herein, a "technology resource" or "account" may be the relationship that the user has with the entity. Examples of technology resources include a deposit account, such as a transaction account (e.g., a banking account), a savings account, an investment account, a money market account, a time deposit, a demand deposit, a prepaid account, a credit card, or the like. The technology resource is also typically associated with and maintained by the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users. User interface is configured to present on one or more display devices associated with user devices, entity systems, processing systems, and the like.

As used herein, an "engine" may refer to core elements of an application, or part of an application that serves as a foundation for a larger piece of software and drives the functionality of the software. In some embodiments, an engine controls and drives the organization of NFTs within the user NFT collection. For example, the engine may dynamically assess how to organize and order NFTs within the first plurality of threads. Furthermore, the engine may determine what NFTs are necessary and in what presentation format to successfully authenticate a user or an entity using token thread authentication. In other embodiments, the engine may be self-contained, but externally controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, "authentication credentials" may be any information that can be used to identify of a user. For example, the system may prompt a user to present a token thread for authentication. A token thread is a collection of tokens, such as NFTs, that can be collected within a simulated digital environment. Collected tokens may be stored as a user NFT collection within the system. Furthermore, token thread authentication may be accomplished by presenting a certain set of tokens, in accordance with authentication requirement parameters. The authentication requirement parameters dictate what tokens are necessary for authentication, including the ordering and presentation of token in specified manners.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. For example, determine may include formulating authentication requirements to grant access to a location via a token thread. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored, and retrieved electronically using a computing device.

As used herein, a "resource transfer," "resource distribution," "resource request," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, accounts, setting up automatic payments, performing/modifying authentication procedures and/or credentials, and the like.

Physical space access control may be accomplished by leveraging a system configured to authenticate a user or entity through a token thread using tokens collected in simulated digital environments. The system extracts tokens and NFTs collected by the user or entity and stores the NFTs as a collection within the system. Furthermore, the system organizes and presents the NFTs in a specific manner to satisfy authentication requirements. Furthermore, the system can utilize authenticating information stored in at least one blockchain and stored off chain in combination with the token thread to authenticate. The system can also leverage authenticating information supplied by the user the entity in combination with the token thread authentication and other stored authenticating information to authenticate the user or entity. With authentication verified by the system, the system can grant access to a location to the user or entity. The system also can generate an interactive interface and present the interface on a device associated with a user.

Physical space access control is vital for granting access to a location to users and entities to fulfill necessary processes, such as financial transactions and the like. However, authenticating the user or entity can be fraught with difficulty. For example, existing forms of authentication, such as user-inputted or provided login credentials, have security challenges due to hacking, compromised accounts, and users and entities forgetting authenticating credentials. Examples of issues regarding forgotten authenticating credentials include users locked out of accounts containing banking resources or digital resources. In addition, user-inputted or provided authenticating credentials are problematic because users may choose simple and ineffective passwords, utilize the same passwords for multiple accounts, or fail to timely change passwords in accordance with best practices. Other forms of authenticating credentials, such as biometric data, can have challenges as well. For example, some systems, such as those based on facial recognition technology, may contain biased algorithms that fail to authenticate certain user groups due to inequitable factors. Other issues with biometric data are forgeries, such as when a malicious actor forges a fingerprint. The malicious actor can then present the forged fingerprint to gain access through a fingerprint reader in such a scenario.

However, use of blockchain-based systems in simulated digital environments can facilitate authentication with the use of non-fungible tokens and smart contracts. Smart contracts allow for proof of ownership, which can serve as a form of authentication. The problem with leveraging such technology is the disconnect between the avatar or persona of a user in a simulated digital environment and the actual identity of the user in the physical, real world. Simulated digital environments and blockchain-based systems can promise a person anonymity and the ability to transact and interact without tracing back to their actual identity. With such an identity divide, the person can be unable to utilize the more secure forms of authentication offered by blockchain systems due to a lack of ability to tie digital resources from simulated digital environments back to their actual identity in the real world. Consequently, access control to physical spaces in the real world is relegated to using existing, inefficient, and less secure forms of authentication.

The token thread authentication system for physical space access resolves the issue with present methods of authentication because it utilizes enhanced, more secure forms of authentication to grant access to a location. The system is configured to extract tokens and NFTs that a user collects in simulated digital environments. The simulated digital environments are virtual worlds that utilize augmented reality and virtual reality. The simulated digital worlds also encompass a merging of physical and virtual spaces in certain applications.

Once the system stores the extracted NFTs and tokens, the system organizes these tokens according to set a of parameters, controlled by an engine in some embodiments of the invention. The set of parameters contain chronological and authentication components, which dictate how the NFTs should be stored. The stored NFTs comprise a user NFT collection. The user NFT collection offers more secure authentication because the NFTs are underpinned by smart contracts, which can act as a form of authentication, as noted previously.

When a user or entity wants to gain entry to a certain location, the system will interact to determine how to satisfy a requisite authentication requirement. For example, the authentication requirement may necessitate presentation of certain tokens or NFTs to validate the user. Based on the authentication requirement, the necessary tokens or NFTs will be presented to the system as a token thread authentication. If the authentication is successful, the user will be granted access to the location. Furthermore, the system contains user interfaces that the user may interact with to view, manipulate, and access graphical objects data associated with the authentication process, resources associated with the user, and the like.

Accordingly, the present invention comprises at least one processing device and at least one storage device containing computer-readable code. The computer-readable code is configured to cause the at least one processing device to extract NFTs collected by a user from at least one simulated digital environment. The system is further configured to organize the NFTs in accordance with a set of chronological and authenticating parameters and to interact with a first network device. The first network device provides a technology resource request associated with access authentication, which is associated with a front-end resource. The system is further configured to determine an access authentication requirement using the technology resource request and to query the stored NFTs in order to present a token thread. The system is configured to present to token thread to authenticate the user, and to generate and to initiate presentation of an interactive interface.

What is more, the present invention provides a technical solution to a technical problem. As described herein, the technical problem includes utilizing enhanced security measures for authentication for granting access to a physical space. The technical solution presented herein allows for enhanced security measures and more efficient authentication protocols. For example, the utilization of digital tokens such as NFTs allows for unique, authentic documentation to validate one's identity. The underlying smart contract within an NFT provides for a quick, reliable, and efficient manner for authentication. Furthermore, the system solves the issue with linking resources and avatars or persons in the virtual and simulated worlds with the real, physical world. The system accomplishes this by storing virtual resources, such as NFTs and using them to authenticate an individual's identity in the real world. Furthermore, the system can utilize the same methodology to authenticate an individual within the real world as a member of a member group from a simulated digital environment.

Moreover, by leveraging a collection of NFTs for authentication purposes, the system as disclosed in the present invention resolves the issue of ineffective passwords. NFTs are by nature unique tokens or resources and thus are not shared. In contrast, different users can have the same exact passwords, which reduces the efficacy of passwords as an authenticating credential. Furthermore, due to robustness of blockchain technology, an NFT is not subject to the same issues surrounding forgotten passwords, PINs, or other forms of user-inputted credentials. Although certain biometric markers can serve as a unique identifier for authentication purposes, sometimes algorithmic bias or forgeries can decrease their effectiveness and security. A combination of NFTs however reduces issues of algorithmic bias and limits the issues of forgeries because NFTs are by definition non-fungible and unique. The ability to require different threads of NFTs in a specific ordering and presentation also increases the security of the present invention because this method of authentication requires a specific combination of unique tokens. Such a requirement increases the security of the authentication due to the high standards involved with multiple unique tokens organized and presented in a specific way.

In addition, the invention as presented enhances the efficiency of authentication because many of the steps involved are executed with minimized user inputs. For example, the system could interact with an entity, such as a financial institution, to determine what authentication requirements are necessary and then to fulfill the authentication request by leveraging stored tokens and other authentication information. Consequently, a user avoids manually inputting information, which takes more time and can be disrupted by input errors. Consequently, each authentication request is more efficient and accurate. The solution could also be extended to authenticate a user regarding digital payments at POS devices. For example, the system could interact with a connected payment terminal to authenticate the user as an authorized payee by presenting a token thread to satisfy an authentication request, as opposed to supplying a PIN associated with a bank account.

Moreover, the invention as presented is implemented utilizing, among other componentry, network devices, at least one entity network system, and interactive user interfaces to allow a user to access the system, manipulate displays, and view information related to physical space access.

Consequently, the token thread authentication system for physical space access is an improvement over existing solutions to the problems with physical space access control, (i) with fewer steps to achieve the solution, thus reducing the amount of computing resources, such as processing resources, storage resources, network resources, and/or the like, that are being used; (ii) providing a more accurate solution to problem, thus reducing the number of resources required to remedy any errors made due to a less accurate solution; (iii) removing manual input and waste from the implementation of the solution, thus improving speed and efficiency of the process and conserving computing resources; (iv) determining an optimal amount of resources that need to be used to implement the solution, thus reducing network traffic and load on existing computing resources; and (v) enhancing the overall security of the physical space access systems. Furthermore, the technical solution described herein uses a rigorous, computerized process to perform specific tasks and/or activities that were not previously performed. In specific implementations, the technical solution bypasses a series of steps previously implemented, thus further conserving computing resources. Accordingly, a need exists for token thread authentication for physical space access.

As discussed previously, embodiments of the present invention alleviate the deficiencies of existing systems and achieve other advantages by providing apparatuses (e.g., a system, computer program product and/or other devices) and methods for token thread authentication for physical space access. Furthermore, the present invention is structured for enhancing security by implementing unique tokens to serve as authenticating parameters.

FIGS. 1A-1C illustrate technical components of an exemplary distributed computing environment for a token thread authentication system for physical space access 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include at least one processing device 102, at least one non-transitory storage device 104, input/output (I/O) device 116, and a storage device 106. The system 130 may also include a high-speed interface 108 connecting to the at least one non-transitory storage device 104, and a low-speed interface 112 connecting to low-speed bus 114 and storage device 106. Each of the components 102, 104, 108, 106, and 112 may be operatively coupled to one another using various buses and may be mounted on a common motherboard or in other manners as appropriate. As described herein, the at least one processing device 102 may include a number of subsystems to execute the portions of processes described herein. Each subsystem may be a self-contained component of a larger system (e.g., system 130) and capable of being configured to execute specialized processes as part of the larger system.

The at least one processing device 102 can process instructions, such as instructions of an application that may perform the functions disclosed herein. These instructions may be stored in the at least one non-transitory storage device 104 (e.g., memory) or on the storage device 106, for execution within the system 130 using any subsystems described herein. It is to be understood that the system 130 may use, as appropriate, multiple processors, along with multiple memories, and/or I/O devices, to execute the processes described herein. Furthermore, the system 130 may serve as an engine for the invention by determining access requirements, organization of tokens or NFTS, and facilitating queries across an entity network system, according to some embodiments of the invention.

The memory 104 stores information within the system 130. In one implementation, the memory 104 is a volatile memory unit or units, such as volatile random-access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on at the least one processing device 102.

The high-speed interface 108 manages bandwidth-intensive operations for the system 130, while the low-speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

An NFT is a cryptographic record (referred to as "tokens") linked to a resource. An NFT is typically stored on a distributed ledger that certifies ownership and authenticity of the resource, and exchangeable in a peer-to-peer network.

FIG. 2A illustrates an exemplary process of creating an NFT 200, in accordance with an embodiment of the invention. As shown in FIG. 2A, to create or "mint" an NFT, a user (e.g., NFT owner) may identify, using a user input device 140, resources 202 that the user wishes to mint as an NFT. Typically, NFTs are minted from digital objects that represent both tangible and intangible objects. These resources 202 may include a piece of art, music, collectible, virtual world items, videos, real-world items such as artwork and real estate, or any other presumed valuable object. These resources 202 are then digitized into a proper format to produce an NFT 204. The NFT 204 may be a multi-layered documentation that identifies the resources 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce—a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, if the NFT 204 is purchased by buyer B1 from a seller S1, the relationship between B1 and S1 as a buyer-seller is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identification number 254A that is used to identify the NFT 204. The metadata layer 256 may include at least a resource location 256A and a resource descriptor 256B. The resource location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The resource location 256A identifies where the resource 202 is stored. The resource descriptor 256B may include specific information associated with the source itself 202. For example, the resource descriptor 256B may include information about the supply, authenticity, lineage, provenance of the resource 202. The licensing layer 258 may include any transferability parameters 258B associated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the invention.

FIG. 3 illustrates a high-level process flow 300 for token thread authentication for physical space access, in accordance with one embodiment of the present invention. As discussed previously, the invention is configured for enhancing access control and location security by using token thread authentication to authenticate the user or the entity.

As illustrated by block 302, in some embodiments, the system comprises at least one non-transitory storage device 104 with computer-readable code stored thereon and at least one processing device 102, in which the at least one processing device 102 is operatively coupled to the at least one non-transitory storage device 104. In some embodiments, the computer-readable code is configured to cause the at least one processing device 102 to extract an NFT 204 from at least one simulated digital environment, wherein the NFT 204 is stored as a user NFT collection. In addition, the at least one simulated digital environment is comprised of augmented reality and virtual reality elements, in some embodiments of the invention.

As illustrated by block 304, the at least one processing device 102 also can organize the user NFT collection into a first plurality of threads, in accordance with a set of chronological and authentication parameters. The set of chronological parameters comprises a listing of when each NFT 204 was added to the user NFT collection, according to one embodiment of the invention. The authentication parameters change dynamically based on dynamic updates on authentication requirements, as controlled by the engine in the system 130, according to some embodiments of the invention. The authentication requirements change in accordance with the level of authentication necessary to access the location. As the set of chronological and authentication parameters change, the at least one processing device 102 reorganizes the user NFT collection within the first plurality of threads. The first plurality of threads may be stored within a network associated with the entity, wherein the network is distributed in accordance with one embodiment of the invention. In an additional embodiment, the first plurality of threads is stored within a decentralized network.

As illustrated by block 306, the at least one processing device 102 receives a technology resource request from a first network device connected to the network 110. The first network device may be an endpoint device 140, according to one embodiment of the invention. The technology resource request is associated with an access authentication verification to grant access to a location. The location may be an ATM, a banking location, banking account, or the like. Furthermore, the access authentication verification is associated with a front-end resource associated with an entity. The front-end resource may be an additional endpoint device, according to some embodiment of the invention. The additional endpoint device may be an ATM, a banking location, a banking application, or physical space, according to different embodiments of the invention.

Furthermore, the at least one processing device 102 determines an access authentication requirement using the technology resource request. The access authentication requirement comprises the required tokens or NFTs for a token thread authentication to satisfy the authentication requirement. The at least one processing device 102 utilizes the authentication requirement to determine what NFTs stored within the first plurality of threads would satisfy the authentication request. As illustrated by block 308, the at least one processing device 102 constructs and transmits a query for an entity network system 130 to query the first plurality of threads for the token thread authentication within the first plurality of threads to satisfy the authentication request. The entity network system 130 communicates and transmits data over the network 110 to the front-end resource, which in some embodiments of the invention is an endpoint device 140. The query created by the at least one processing device 102 is created using the technology resource request, in which the at least one processing device 102 determines what authentication requirements are necessary to gain access to the location. The at least one processing device 102 then receives the query results from the entity network system 130, wherein the query results comprise all NFTs associated with the token thread authentication for authenticating the access request.

In some embodiments of the invention the query across the entity network system 130 can be transformed to query across a second entity network system. The second entity network system may be associated with the same entity as the entity network system 130 or it may be associated with a different entity, in accordance with different embodiments of the invention. Querying across a second entity network system can facilitate querying differing sets of user NFT collections. The results of the query comprise a combination of authenticating information retrieved from the entity network system and the additional entity network. The authenticating information retrieved comprises tokens, NFTs, user NFT collections, token threads, other authenticating information, and the like, in accordance with some embodiments of the invention. As a result, this allows for presenting additional options of token threads to satisfy an authentication request.

As illustrated by block 310, the at least one processing device 102 presents the token thread authentication within the first plurality of threads received from the query across the entity network system 130 to the front-end resource, wherein the front-end resource is associated with the entity. According to one embodiment of the invention, the front-end resource is an endpoint device 140.

As illustrated by block 312, the at least one processing device 102 verifies that the token thread authentication satisfied the authentication requirement and determines to grant access to the location. In one embodiment of the invention, the location is the front-end resource 140. In this embodiment, when the access is granted to the location, a user or entity is then able to interact with the location.

The location is a physical space, such as an ATM, a banking branch, a payment terminal, or any other physical meeting space, according to some embodiments of the invention. According to other embodiments of the invention, the location is in a simulated digital environment. In other embodiments, the system 300 can identify and authenticate a member of a member group from the simulated digital environment without sharing the authenticating information to other members of the member group. As a result, the member is authenticated in a secure and anonymous fashion in relation to other members of the member group. The authentication of a member may occur in the physical world at some physical location or within a simulated digital environment, in accordance with different embodiments of the invention. In some embodiments, the access grantee is the user or the entity seeking access.

As illustrated by block 314, the at least one processing device 102 generates a real-time interactive technology interface associated with the front-end resource. The real-time technology resource interface is structured to manipulate and to present graphical interface objects associated with the token thread authentication on various screens. Furthermore, the at least one processing device 102 initiates presentation of the real-time interactive technology interface via display device associated with the user. According to some embodiments of the inventions, the display device is a computing device, including an endpoint device 140 such as a mobile device or computing device.

According to some embodiments of the invention, the real-time interactive technology interface may comprise graphical manipulation tools and control elements like checklists, tables, drop down lists, list boxes, pop-up menus, widgets, radio buttons, toggle switches, toolbars, text boxes and the like to enable user selection of parameters, navigation through the interface, user input of one or more parameters, and display of confirmation or output. In some embodiments real-time interactive technology interface enables the user to modify parameters associated with the display of the graphical interface objects.

In some embodiments of the invention, the at least one processing device 102 extracts authenticating information in at least one non-simulated digital environment, such as the physical world, in which the authenticating information originated from a plurality of networks 110 associated with the entity. The authenticating information includes authentication credentials, such as user-supplied authentication information, biometric screening information, and the like. Furthermore, the at least one processing device 102 stores and organizes the extracted authenticating information into a second plurality of threads and according to a second set of chronological and authenticating parameters, according to the engine of the system 130 as illustrated by some embodiments of the invention. The second plurality of threads may be stored within a distributed, decentralized, or centralized network, in accordance with different embodiments of the invention. In addition, the at least one processing device 102 constructs and transmits a query the entity network system to query the second plurality of threads, in accordance with some embodiments of the invention. The query is structured to retrieve the token thread authentication within the first plurality of threads and to retrieve authenticating information from the first plurality of threads and the second plurality of threads to satisfy the authentication request.

In some embodiments of the invention, the token thread authentication system for physical space access is utilized to authenticate transactions. For example, an endpoint 140 may communicate over network 110 a need to authenticate a user in a transaction. The endpoint 140 may be a connected payment terminal, such as a POS device, that needs to authorize a payment. The at least one processing device 102 then executes the aforementioned procedure for token thread authentication. In this scenario, the token thread authentication authenticates the user, and the transaction is approved and executed.

FIG. 4 illustrates a high-level process flow 400 for token thread authentication for physical space access, in accordance with one embodiment of the present invention.

As illustrated in blocks 402, the at least one processing device 102 constructs a first log for the extraction of tokens from the simulated digital world, wherein the first log contains a plurality of information regarding the extraction. For example, the first log contains a first timestamp for the extraction of each token or NFT, a reference address of each token or NFT on a distributed or decentralized network, and a thread reference location of each token or NFT within the first plurality of threads, in accordance with some embodiments of the invention. The first timestamp indicates the chronology of when each token or NFT was extracted by the system. The references address of each token or NFT indicates the location of each token or NFT within a distributed or decentralized network. The thread reference location of each token or NFT indicates where each token or NFT is stored within the first plurality of threads.

As illustrated in block 406, the at least one processing device 102 constructs a second log containing the authenticating information within the second plurality of threads, including a second timestamp of the collection of the authenticating information, a type of the authenticating information, and a reference location of the authenticating information within the first plurality of threads and the second plurality of threads. The authenticating information within the first plurality of threads and the second plurality of threads refers to authenticating credentials and the like stored within the system. The second timestamp contains the chronology of when each component of authenticating information was collected by the system. According to some embodiments of the invention, the type of authenticating information includes descriptions of what the authenticating information is, such as biographical data, biometric data, credentials data, and the like. The reference location of authenticating information indicates where within the first plurality of threads and the second plurality of threads each component of authenticating information is stored.

As illustrated in block 406, the at least one processing device 102 constructs a third log of access requests, wherein the third log includes a third timestamp for each access request, a location identity of the location, an entity network system identity, an authenticating information requirement from the first plurality of threads and the second plurality of threads, the query to the entity network system, a fourth timestamp of the query, the results of the query to the entity network system, a fifth timestamp of the results of the query, and a result of whether the access request granted permission to the location.

The third timestamp presents a chronology for each access request generated by the user or the entity. The entity network system identity identifies which entity network system within the network 110 participates in the querying process of token thread authentication. The authenticating information requirement comprises the authenticating parameters and necessities for the user or the entity to gain access to the location. According to some embodiments of the invention, the authenticating information requirement comprises token thread authentication derived from the first plurality of threads, authenticating information derived from the first plurality of threads and the second plurality of threads, and authenticating credentials inputted by the user or entity. The query is a request for information associated with authenticating the user or the entity through information stored within the system or provided by the user or entity. The fourth timestamp presents a chronology of when the query to the entity network system occurred. The results of the query present an answer to the request for information associated with authentication. The fifth timestamp presents a chronology of when the query to the entity network system returned results. The result of whether the access request granted permission to the location represents whether the access request succeeded in giving the user or entity access to the location.

According to some embodiments of the invention, the location identity may comprise a physical address, a physical location, a network address, an IP address, and the like. The authenticating information requirement may comprise the level of authentication necessary to gain access to the location, including which NFTs stored in the first plurality of threads and what authentication information stored in the first plurality of threads and the second plurality of threads are necessary to form the token thread authentication.

As illustrated in block 408, the at least one processing device 102 generates a second real-time interactive technology resource interface associated with the front-end resource 140. Furthermore, the second technology resource interface is structured to manipulate and to present graphical interface objects associated with the first log, the second log, and the third log. The second technology resource interface dynamically changes across various screens in correspondence with the manipulation of the graphical interface objects, in accordance with some embodiments of the invention.

As illustrated in block 410, the at least one processing device 102 initiates presentation, via a second display device of the user device associated with the user, of the second real-time interactive technology resource interface. The user device associated with the user is an endpoint device 140, such as a mobile device or computing device, in accordance with an embodiment of the invention. According to some embodiments of the invention, the second real-time interactive technology interface may comprise graphical manipulation tools and control elements like checklists, tables, drop down lists, list boxes, pop-up menus, widgets, radio buttons, toggle switches, toolbars, text boxes, and the like to enable user selection of parameters, navigation through the interface, user input of one or more parameters, and display of confirmation or output. In some embodiments, the second real-time interactive technology interface enables the user to modify parameters associated with the display of the graphical interface objects.

FIG. 5 illustrates an authentication continuum 500 representing the various and differing levels of authentication based on the authentication parameters necessary to gain access to a particular location. The authentication requirement may include a token thread derived from the first plurality of threads, authenticating information stored within the first plurality of threads and the second plurality of threads, or authenticating credentials inputted by the user, in accordance with various embodiments of the invention. The system determines the access requirement parameters based on factors such as the location, the type of information requested by a user, the time of day, and the like to determine what a user must supply to the gain access to the location. For example, in some embodiments of the invention, the system automatically will determine the authentication requirement, transmit the requirement over the network 110 to a user endpoint device 140, and the system will direct the at least one processing unit 102 to organize, query, and present the necessary authenticating credentials from the first plurality of threads and the second plurality of threads in order to grant the user access to the location. In other embodiments of the invention, the system will direct the user to input authenticating credentials, either in combination with the aforementioned-automated process or without the inclusion of the automated process.

At one end of the authentication continuum, there is no authentication requirement to gain access to the location and a corresponding full display of any sensitive information. The display of sensitive information may be displayed upon an endpoint device 140 associated with a user, such as a mobile device, or upon an endpoint device associated with the entity, such as an app, terminal, kiosk, ATM, and the like. The display of the sensitive information may be presented across various screens, in accordance with some embodiments of the invention. The sensitive information associated with the user may be financial information, personal sensitive information, and the like. According to some embodiments of the invention, this scenario would involve no token thread authentication derived from the first plurality of threads, no input of authenticating credentials from the user or the entity, and no utilization of other authenticating information from the first plurality of threads and the second plurality of threads.

Advancing along the authentication continuum, the system may require minimal authentication in order to grant access to the location to the user, in accordance with some embodiments of the invention. In some embodiments of the invention, the token thread authentication includes at least one NFT stored within the first plurality of threads. Furthermore, the minimal authentication may necessitate the usage of a token thread derived from the first plurality of threads, authenticating credentials stored within the first plurality of threads and the second plurality of threads, or authenticating credentials inputted by a user, as dictated by the authentication requirement.

Furthermore, additional advancement along the authentication continuum depicts a moderate authentication requirement. According to some embodiments of the invention, this authentication requirement necessitates the presentation of multiple NFTs stored within the first plurality of threads via token thread authentication. Moreover, the authentication requirement may require the presentation of authenticating information in combination with or to the exclusion of token thread authentication. In other embodiments of the invention, the authentication requirement may necessitate the presentation of a combination of a token thread derived from the first plurality of threads, authenticating information derived from the first plurality of threads and the second plurality of threads, and authenticating credentials inputted by the user.

Most authentication, as depicted within the authentication continuum, necessitates a heightened authentication requirement to gain access to the location. The authentication requirement in such a scenario may involve the presentation of different token threads in order to authenticate, according to some embodiments of the invention. For example, the token thread authentication comprises multiple threads for authentication associated with different levels of security access, wherein the different levels of security access are associated with the set of chronological and authenticating parameters to verify financial statistics, credit history, account ownership, account access permissions, and the like associated with the user. The multiple threads may comprise multiple NFTs, cryptocurrency, virtual resources, digital tokens, and any other digital resources of value, according to some embodiments of the invention.

The usage of multiple token threads allows the system to validate multiple tokens to authenticate a user. In this scenario, the automated process works in a similar fashion as described earlier. The authentication requirement dictates organization, querying, and presentation of various authenticating credentials stored within the system, such as token threads stored within the first plurality of threads and authenticating information stored within the first plurality of threads and the second plurality of threads. The authentication requirement, according to some embodiments of the invention, necessitate the input of multiple authenticating credential types by the user, such as login credentials, biometric data, and the like. The most authentication scenario comprises the largest and most complex authentication requirement by the system.

At the far end of the authentication continuum, this scenario illustrates full device tracking and shut down of sensitive information. The authentication requirement in such a scenario is so high that the user will not be granted access to the location by the system. Rather, the system cuts off access to the endpoint 140 and ceases presentation of any sensitive information. The endpoint 140 may be a banking terminal, physical banking location, online portal accessed by a computing device, user device, or an ATM, in accordance with some embodiments of the invention.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random-access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for physical space access using token thread authentication, the system comprising:
   at least one non-transitory storage device with computer-readable program code stored thereon; and
   at least one processing device that is operatively coupled to the at least one non-transitory storage device, wherein the computer-readable program code is configured to cause the at least one processing device to:
   extract non-fungible tokens (NFTs) collected by a user from at least one simulated digital environment, wherein the NFTs collected are stored as a user NFT collection;
   organize the user NFT collection within a first plurality of threads, according to a set of chronological and authenticating parameters;
   receive, from a first network device, a technology resource request associated with an access authentication verification associated with a front-end resource associated with an entity for the user to grant access to a location;
   determine an access authentication requirement using the technology resource request, wherein the access authentication requirement comprises required tokens for a token thread authentication stored within the first plurality of threads to satisfy the technology resource request;
   construct and transmit a query for an entity network system to query the first plurality of threads for the token thread authentication within the first plurality of threads to satisfy the technology resource request;
   receive query results from the entity network system, wherein the query results comprise all NFTs associated with the token thread authentication for authenticating the technology resource request;
   present the token thread authentication within the first plurality of threads received from the query across the entity network system to the front-end resource associated with the entity;
   verify the token thread authentication returned from the query satisfied the access authentication requirement and determine to grant access to the location; and
   generate a real-time interactive technology resource interface associated with the front-end resource, wherein the real-time interactive technology resource interface is structured to manipulate and to present graphical interface objects associated with the token thread authentication, and initiate presentation of the real-time interactive technology resource interface via a display device of a user device associated with the user.

2. The system of claim 1, further comprising:
   extracting authenticating information in at least one non-simulated digital environment, wherein the authenticating information originated from a plurality of networks associated with the entity;
   storing the extracted authenticating information into a second plurality of threads;
   organizing the extracted authenticating information within the second plurality of threads, according to a second set of chronological and authenticating parameters; and
   constructing and transmitting the query for the entity network system to query the second plurality of threads, wherein the query is structured to retrieve the token thread authentication within the first plurality of threads and to retrieve authenticating information from the first plurality of threads and the second plurality of threads to satisfy the technology resource request.

3. The system of claim 1, wherein the token thread authentication further comprises multiple threads for authentication associated with different levels of security access, wherein the different levels of security access are associated with the set of chronological and authenticating parameters to verify financial statistics, credit history, account ownership, and account access permissions associated with the user.

4. The system of claim 1, further comprises identifying and authenticating a member of a member group from the at least one simulated digital environment in the location without sharing authenticating information to other members of the member group.

5. The system of claim 1, further comprising using the token thread authentication in a non-simulated digital environment to access the location, wherein the location is a physical location.

6. The system of claim 1, further comprising using the token thread authentication in the at least one simulated digital environment to access the location, wherein the location is a simulated digital environment.

7. The system of claim 1, further comprising
   constructing a first log for the extraction of tokens from the at least one simulated digital environment, wherein the first log contains a first timestamp of the extraction for each token, a reference address of each token on a distributed or decentralized network, and a thread reference location of each token within the first plurality of threads;
   constructing a second log containing authenticating information within a second plurality of threads, including a second timestamp of the collection of the authenticating information, a type of the authenticating information, and a reference location of authenticating information within the first plurality of threads and the authenticating information in second plurality of threads;
   constructing a third log of technology resource requests, wherein the third log includes a third timestamp for access technology resource request, a location identity of the location, an entity network system identity, an authenticating information requirement from the first plurality of threads and the second plurality of threads, the query to the entity network system, a fourth timestamp of the query, a fifth timestamp of the query results of the query, and a result of whether the technology resource request granted permission to the location;

generating a second real-time interactive technology resource interface associated with the front-end resource, wherein the second real-time interactive technology resource interface is structured to manipulate and to present graphical interface objects associated with the first log, the second log, and the third log; and initiating presentation, via a second display device of the user device associated with the user, of the second real-time interactive technology resource interface.

8. A computer program product for physical space access using token thread authentication, the computer program product comprising at least one non-transitory computer-readable medium having computer-readable program code portions embodied therein, the computer-readable program code portions comprising:

an executable portion for extracting non-fungible tokens (NFTs) collected by a user from at least one simulated digital environment, wherein the NFTs collected are stored as a user NFT collection;

an executable portion for organizing the user NFT collection within a first plurality of threads, according to a set of chronological and authenticating parameters;

an executable portion for receiving, from a first network device, a technology resource request associated with an access authentication verification associated with a front-end resource associated with an entity for the user to grant access to a location;

an executable portion for determining an access authentication requirement using the technology resource request, wherein the access authentication requirement comprises required tokens for a token thread authentication stored within the first plurality of threads to satisfy the technology resource request;

an executable portion for constructing and transmitting a query for an entity network system to query the first plurality of threads for the token thread authentication within the first plurality of threads to satisfy the technology resource request;

an executable portion for receiving query results from the entity network system, wherein the query results comprise all NFTs associated with the token thread authentication for authenticating the technology resource request;

an executable portion for presenting the token thread authentication within the first plurality of threads received from the query across the entity network system to the front-end resource associated with the entity;

an executable portion for verifying the token thread authentication returned from the query satisfied the access authentication requirement and determine to grant access to the location; and an executable portion for generating a real-time interactive technology resource interface associated with the front-end resource, wherein the real-time interactive technology resource interface is structured to manipulate and to present graphical interface objects associated with the token thread authentication, and initiate presentation of the real-time interactive technology resource interface via a display device of a user device associated with the user.

9. The computer program product of claim 8, further comprising:

an executable portion for extracting authenticating information in at least one non-simulated digital environment, wherein the authenticating information originated from a plurality of networks associated with the entity;

an executable portion for storing the extracted authenticating information into a second plurality of threads;

an executable portion for organizing the extracted authenticating information within the second plurality of threads, according to a second set of chronological and authenticating parameters; and an executable portion for constructing and transmitting the query for the entity network system to query the second plurality of threads, wherein the query is structured to retrieve the token thread authentication within the first plurality of threads and to retrieve authenticating information from the first plurality of threads and the second plurality of threads to satisfy the technology resource request.

10. The computer program product of claim 8, wherein the token thread authentication further comprises multiple threads for authentication associated with different levels of security access, wherein the different levels of security access are associated with the set of chronological and authenticating parameters to verify financial statistics, credit history, account ownership, and account access permissions associated with the user.

11. The computer program product of claim 8, further comprising an executable portion for identifying and authenticating a member of a member group from the at least one simulated digital environment in the location without sharing authenticating information to other members of the member group.

12. The computer program product of claim 8, further comprising an executable portion for using the token thread authentication in a non-simulated digital environment to access the location, wherein the location is a physical location.

13. The computer program product of claim 8, further comprising an executable portion for using the token thread authentication in the at least one simulated digital environment to access the location, wherein the location is a simulated digital environment.

14. The computer program product of claim 8, further comprising:

an executable portion for constructing a first log for the extraction of tokens from the at least one simulated digital environment, wherein the first log contains a first timestamp of the extraction for each token, a reference address of each token on a distributed or decentralized network, and a thread reference location of each token within the first plurality of threads;

an executable portion for constructing a second log containing authenticating information within a second plurality of threads, including a second timestamp of the collection of the authenticating information, a type of the authenticating information, and a reference location of authenticating information within the first plurality of threads and the authenticating information in second plurality of threads;

an executable portion for constructing a third log of technology resource requests, wherein the third log includes a third timestamp for each technology resource request, a location identity of the location, an entity network system identity, an authenticating information requirement from the first plurality of threads and the second plurality of threads, the query to the entity network system, a fourth timestamp of the query, a fifth timestamp of the query results of the query, and a result of whether the technology resource request granted permission to the location;
an executable portion for generating a second real-time interactive technology resource interface associated with the front-end resource, wherein the second real-time interactive technology resource interface is structured to manipulate and to present graphical interface objects associated with the first log, the second log, and the third log; and
an executable portion for initiating presentation, via a second display device of the user device associated with the user, of the second real-time interactive technology resource interface.

15. A computer-implemented method for physical space access using token thread authentication, the method comprising:
providing a computing system comprising a computer processing device and a non-transitory computer readable medium, where the computer readable medium comprises configured computer program instruction code, such that when the instruction code is operated by the computer processing device, the computer processing device performs the following operations:
extracting non-fungible tokens (NFTs) collected by a user from at least one simulated digital environment, wherein the NFTs collected are stored as a user NFT collection;
organizing the user NFT collection within a first plurality of threads, according to a set of chronological and authenticating parameters;
receiving, from a first network device, a technology resource request associated with an access authentication verification associated with a front-end resource associated with an entity for the user to grant access to a location;
determining an access authentication requirement using the technology resource request, wherein the access authentication requirement comprises required tokens for a token thread authentication stored within the first plurality of threads to satisfy the technology resource request;
constructing and transmitting a query for an entity network system to query the first plurality of threads for the token thread authentication within the first plurality of threads to satisfy the technology resource request;
receiving query results from the entity network system, wherein the query results comprise all NFTs associated with the token thread authentication for authenticating the technology resource request;
presenting the token thread authentication within the first plurality of threads received from the query across the entity network system to the front-end resource associated with the entity;
verifying the token thread authentication returned from the query satisfied the access authentication requirement and determine to grant access to the location; and
generating a real-time interactive technology resource interface associated with the front-end resource, wherein the real-time interactive technology resource interface is structured to manipulate and to present graphical interface objects associated with the token thread authentication, and initiate presentation of the real-time interactive technology resource interface via a display device of a user device associated with the user.

16. The computer-implemented method of claim 15, further comprising:
extracting authenticating information in at least one non-simulated digital environment, wherein the authenticating information originated from a plurality of networks associated with the entity;
storing the extracted authenticating information into a second plurality of threads;
organizing the extracted authenticating information within the second plurality of threads, according to a second set of chronological and authenticating parameters; and
constructing and transmitting the query for the entity network system to query the second plurality of threads, wherein the query is structured to retrieve the token thread authentication within the first plurality of threads and to retrieve authenticating information from the first plurality of threads and the second plurality of threads to satisfy the technology resource request.

17. The computer-implemented method of claim 15, wherein the token thread authentication further comprises multiple threads for authentication associated with different levels of security access, wherein the different levels of security access are associated with the set of chronological and authenticating parameters to verify financial statistics, credit history, account ownership, and account access permissions associated with the user.

18. The computer-implemented method of claim 15, further comprises identifying and authenticating a member of a member group from the at least one simulated digital environment in the location without sharing authenticating information to other members of the member group.

19. The computer-implemented method of claim 15, further comprising using the token thread authentication in a non-simulated digital environment to access the location, wherein the location is a physical location.

20. The computer-implemented method of claim 15, further comprising
constructing a first log for the extraction of tokens from the at least one simulated digital environment, wherein the first log contains a first timestamp of the extraction for each token, a reference address of each token on a distributed or decentralized network, and a thread reference location of each token within the first plurality of threads;
constructing a second log containing authenticating information within a second plurality of threads, including a second timestamp of the collection of the authenticating information, a type of the authenticating information, and a reference location of authenticating information within the first plurality of threads and the authenticating information in second plurality of threads;
constructing a third log of technology resource requests, wherein the third log includes a third timestamp for each technology resource request, a location identity of the location, an entity network system identity, an authenticating information requirement from the first plurality of threads and the second plurality of threads, the query to the entity network system, a fourth timestamp of the query, a fifth timestamp of the query results of the query, and a result of whether the technology resource request granted permission to the location;

generating a second real-time interactive technology resource interface associated with the front-end resource, wherein the second real-time interactive technology resource interface is structured to manipulate and to present graphical interface objects associated with the first log, the second log, and the third log; and initiating presentation, via a second display device of the user device associated with the user, of the second real-time interactive technology resource interface.

\* \* \* \* \*